US007976697B2

(12) United States Patent
Krishnamoorthy et al.

(10) Patent No.: US 7,976,697 B2
(45) Date of Patent: Jul. 12, 2011

(54) NO$_x$ REDUCTION COMPOSITIONS FOR USE IN PARTIAL BURN FCC PROCESSES

(75) Inventors: M. Sundaram Krishnamoorthy, Columbia, MD (US); Michael Scott Ziebarth, Columbia, MD (US); George Yaluris, Clarksville, MD (US); Roger Jean Lussier, Ellicott City, MD (US); John Allen Rudesill, Columbia, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 214 days.

(21) Appl. No.: 11/918,085

(22) PCT Filed: Mar. 24, 2006

(86) PCT No.: PCT/US2006/010968
§ 371 (c)(1),
(2), (4) Date: Oct. 8, 2007

(87) PCT Pub. No.: WO2006/118700
PCT Pub. Date: Nov. 9, 2006

(65) Prior Publication Data
US 2009/0050527 A1    Feb. 26, 2009

Related U.S. Application Data

(60) Provisional application No. 60/676,618, filed on Apr. 29, 2005.

(51) Int. Cl.
*C10G 11/05* (2006.01)
*B01J 29/068* (2006.01)
*B01J 29/08* (2006.01)

(52) U.S. Cl. ......... 208/120.35; 208/120.01; 208/120.25; 502/74; 502/77; 502/79

(58) Field of Classification Search .................. 208/113, 208/118, 119, 121, 120.01, 120.25, 120.35; 502/74, 77, 78, 79
See application file for complete search history.

(56) References Cited

U.S. PATENT DOCUMENTS
3,364,136 A    1/1968   Chen et al. .................... 208/120
(Continued)

FOREIGN PATENT DOCUMENTS
EP            0355928         2/1990
(Continued)

OTHER PUBLICATIONS

American Chemical Society Symposium Series, Contaminant-Metal Deactivation and Metal-Dehydrogenation Effects During Cyclic Propylene Steaming of Fluid Catalytic Cracking Catalysts, No. 634, Chapter 12, pp. 171-183 (1996) by L.T. Boock, T.F. Petti, and J.A. Rudesill.

(Continued)

*Primary Examiner* — Walter D Griffin
*Assistant Examiner* — Renee Robinson
(74) *Attorney, Agent, or Firm* — Beverly J. Artale; Charles A. Cross

(57) ABSTRACT

A NO$_x$ reduction composition and process of using the composition to reduce the content of NO$_x$ emissions and gas phase reduced nitrogen species released from the regeneration zone during fluid catalytic cracking of a hydrocarbon feedstock into lower molecular weight components is disclosed. The process comprises contacting a hydrocarbon feedstock during a fluid catalytic cracking (FCC) process wherein a regeneration zone of an fluid catalytic cracking unit (FCCU) is operated in a partial or incomplete combustion mode under FCC conditions, with a circulating inventory of an FCC cracking catalyst and a particulate NO$_x$ reduction composition. The NO$_x$ reduction composition has a mean particle size of greater than 45 µm and comprises (1) a zeolite component having (i) a pore size of form 2-7 A Angstroms and (ii) a SiO$_2$ to Al$_2$O$_3$ molar ratio of less than 500, and (2) at least one noble metal selected from the group consisting of platinum, palladium, rhodium, iridium, osmium, ruthenium, rhenium and mixtures thereof.

82 Claims, 3 Drawing Sheets

U.S. PATENT DOCUMENTS

| | | | |
|---|---|---|---|
| 3,894,940 A * | 7/1975 | Scherzer et al. | 502/67 |
| 4,072,600 A | 2/1978 | Schwartz | 208/120 |
| 4,088,568 A | 5/1978 | Schwartz | 208/121 |
| 4,093,535 A | 6/1978 | Schwartz | 208/120 |
| 4,153,535 A | 5/1979 | Vasalos et al. | 208/120 |
| 4,159,239 A | 6/1979 | Schwartz | 208/113 |
| 4,199,435 A | 4/1980 | Chessmore et al. | 208/113 |
| 4,251,395 A | 2/1981 | Schwartz | 252/455 |
| 4,265,787 A | 5/1981 | Schwartz | 252/455 |
| 4,290,878 A | 9/1981 | Blanton, Jr. | 208/120 |
| 4,368,057 A | 1/1983 | Matthews | 47/197 |
| 4,434,147 A | 2/1984 | Dimpfl et al. | 423/235 |
| 4,437,147 A | 3/1984 | Takamura et al. | 363/61 |
| 4,626,419 A | 12/1986 | Lewis et al. | 423/244 |
| 4,744,962 A | 5/1988 | Johnson et al. | 423/235 |
| 4,747,935 A | 5/1988 | Scherzer | 208/120 |
| 4,755,282 A | 7/1988 | Samish et al. | 208/113 |
| 4,778,665 A | 10/1988 | Krishnamurthy et al. | 423/239 |
| 4,812,430 A | 3/1989 | Child | 502/42 |
| 4,812,431 A | 3/1989 | Child | 502/42 |
| 4,973,399 A | 11/1990 | Green et al. | 208/120 |
| 4,976,847 A * | 12/1990 | Maxwell et al. | 208/120.15 |
| 4,980,052 A | 12/1990 | Green et al. | 208/120 |
| 4,988,432 A * | 1/1991 | Chin | 208/121 |
| 5,021,144 A | 6/1991 | Altrichter | 208/113 |
| 5,037,538 A | 8/1991 | Chin et al. | 208/113 |
| 5,173,278 A | 12/1992 | Marler | 423/239 |
| 5,242,881 A | 9/1993 | Tang | 502/244 |
| 5,364,517 A | 11/1994 | Dieckmann et al. | 208/121 |
| 5,382,352 A | 1/1995 | Hansen et al. | 208/121 |
| 5,443,807 A | 8/1995 | Tang | 423/247 |
| 5,547,648 A | 8/1996 | Buchanan et al. | 423/210 |
| 5,565,181 A | 10/1996 | Dieckmann et al. | 423/239.1 |
| 6,129,834 A | 10/2000 | Peters et al. | 208/120.01 |
| 6,143,167 A | 11/2000 | Peters et al. | 208/113 |
| 6,165,933 A | 12/2000 | Peters et al. | 502/330 |
| 6,280,607 B1 | 8/2001 | Peters et al. | 208/120.01 |
| 6,358,881 B1 | 3/2002 | Peters et al. | 502/304 |
| 6,379,536 B1 | 4/2002 | Peters et al. | 208/120.01 |
| 6,528,031 B1 * | 3/2003 | Park et al. | 423/239.2 |
| 6,660,683 B1 | 12/2003 | Yaluris et al. | 502/241 |
| 6,881,390 B2 | 4/2005 | Yaluris et al. | 423/239.1 |
| 7,030,055 B2 | 4/2006 | Yaluris et al. | 502/326 |
| 7,304,011 B2 | 12/2007 | Yaluris et al. | 502/65 |
| 2004/0074809 A1 | 4/2004 | Yaluris et al. | 208/113 |
| 2004/0245148 A1 | 12/2004 | Xu | 208/113 |
| 2004/0262197 A1 * | 12/2004 | McGregor et al. | 208/120.01 |
| 2005/0100493 A1 | 5/2005 | Yaluris et al. | 423/235 |
| 2005/0100494 A1 | 5/2005 | Yaluris et al. | 423/235 |
| 2005/0232839 A1 | 10/2005 | Yaluris et al. | 423/239 |
| 2006/0006100 A1 | 1/2006 | Yaluris et al. | 208/113 |
| 2006/0021910 A1 | 2/2006 | Yaluris et al. | 208/113 |

FOREIGN PATENT DOCUMENTS

| | | |
|---|---|---|
| WO | 95/03876 | 2/1995 |
| WO | 96/34685 | 11/1996 |
| WO | 97/48480 | 12/1997 |
| WO | 2005/005578 | 1/2005 |
| WO | 2005/047429 | 5/2005 |

OTHER PUBLICATIONS

Sadeghbeigi, Fluid Catalytic Cracking Handbook, Gulf Publ. Co. Houston, 1995, ISBN 0-88415-290-1.

J.S. Magee and M.M. Mitchell, Jr. Eds. Studies in Surface Science and Catalysis vol. 76, Ch 8, pp. 257-292, Elsevier Science Pulbishers B.V., Amsterdam 1993, ISBN 0-444-89037-8 ; G.W. Young, "Realistic Assessment of FCC Catalyst Performance in the Laboratory," in Fluid Catalytic Cracking: Science and Technology.

Corma, et al., "Simultaneous Catalytic Removal of Sox and Nox with Hydrotalcite-Derived Mixed Oxides Containing Copper, and Their Possibilities to be Used in FCC Units," Journal of Catalysis, 170,140 (1997).

Venuto and Habib, "Fluid Catalytic Cracking with Zeolite Catalysts," Marcel Dekker, New York 1979, ISBN 0-8247-6870-1.

"The John Zink Combustion Handbook," editor, Charles E. Baulkal, Jr., published by CRC Press, 2001.

G. Yaluris and A.W. Peters "Studying the Chemistry of the FCCU Regenerator in the Laboratory Under Realistic Conditions," Designing Transportation Fuels for a Cleaner Environment, J.G. Reynolds and M.R. Khan, eds., p. 151, Taylor & Francis, 1999, ISBN: 1-56032-813-4.

G. W. Young, G. D. Weatherbee, and S. W. Davey, "Simulating Commercial FCCU yields with the Davison Circulating Riser (DCR) pilot plant unit," National Petroleum Refiners Association (NPRA) Paper AM88-52.

* cited by examiner

Effectiveness of Additive B for reducing $NH_3$ emissions in the DCR

$NO_x$ REDUCTION COMPOSITIONS FOR USE IN PARTIAL BURN FCC PROCESSES

CROSS REFERENCE TO RELATED APPLICATIONS

This application is a 35 USC 371 filing of PCT International Application No. PCT/US2006/010968, filed on Mar. 24, 2006, which claims the priority of U.S. Provisional Application No. 60/676,618, filed on Apr. 29, 2005.

This application also claims the benefit of Provisional Application No. 60/676,618, filed on Apr. 29, 2005, under Title 35, United States Code, §119(e).

FIELD OF THE INVENTION

The present invention relates to NO reduction compositions and the method of use thereof to reduce $NO_x$ emissions in refinery processes, and specifically in fluid catalytic cracking (FCC) processes. More particularly, the present invention relates to $NO_x$ reduction compositions and their method of use to reduce the content of gas phase reduced nitrogen species in FCC regenerator off gases released from a fluid catalytic cracking unit (FCCU) regenerator operating in a partial or incomplete combustion mode.

BACKGROUND OF THE INVENTION

In recent years, there has been an increased concern in the United States and elsewhere about air pollution from industrial emissions of noxious oxides of nitrogen, sulfur and carbon. In response to such concerns, government agencies have in some cases already placed limits on allowable emissions of one or more of the pollutants, and the trend is clearly in the direction of increasingly stringent restrictions.

$NO_x$, or oxides of nitrogen, in flue gas streams exiting from FCC regenerators is a pervasive problem. FCCUs process heavy hydrocarbon feeds containing nitrogen compounds a portion of which is contained in the coke on the catalyst as it enters the regenerator. Some of this coke nitrogen is eventually converted into $NO_x$ emissions, either in the FCC regenerator or in a downstream CO boiler. Thus, all FCCUs processing nitrogen-containing feeds can have a $NO_x$ emissions problem due to catalyst regeneration.

In an FCC process, catalyst particles (inventory) are repeatedly circulated between a catalytic cracking zone and a catalyst regeneration zone. During regeneration, coke deposits from the cracking reaction on the catalyst particles and is removed at elevated temperatures by oxidation with oxygen containing gases such as air. The removal of coke deposits restores the activity of the catalyst particles to the point where they can be reused in the cracking reaction. The coke removal step is performed over a wide range of oxygen conditions. At the minimum, there is typically at least enough oxygen to convert essentially all of the coke made to CO and $H_2O$. At the maximum, the amount of oxygen available is equal to or greater than the amount necessary to oxidize essentially all of the coke to $CO_2$ and $H_2O$.

In an FCC unit operating with sufficient air to convert essentially all of the coke on the catalyst to $CO_2$ and $H_2O$, the gas effluent exiting the regenerator will contain "excess oxygen" (typically 0.5 to 4% of total off gas). This combustion mode of operation is usually called "full burn". When the FCCU regenerator is operating in full burn mode, the conditions in the regenerator are for the most part oxidizing. That is, there is at least enough oxygen to convert (burn) all reducing gas phase species (e.g., CO, ammonia, HCN) regardless of whether this actually happens during the residence time of these species in the regenerator. Under these conditions, essentially all of the nitrogen deposited with coke on the catalyst during the cracking process in the FCCU riser is eventually converted to molecular nitrogen or $NO_x$ and exits the regenerator as such with the off gas. The amount of coke nitrogen converted to $NO_x$ as opposed to molecular nitrogen depends on the design, conditions and operation of the FCCU, and especially of the regenerator, but typically, the majority of coke nitrogen exits the regenerator as molecular nitrogen. On the other hand, when the amount of air added to the FCCU regenerator is insufficient to fully oxidize the coke on the cracking catalyst to $CO_2$ and $H_2O$, some of the coke remains on the catalyst, while a significant portion of the burnt coke carbon is oxidized only to CO. In FCCUs operating in this fashion, oxygen may or may not be present in the regenerator off gas. However, should any oxygen be present in the regenerator off gas, it is typically not enough to convert all of the CO in the reduced gas phase species in the gas stream. This mode of operation is usually called "partial burn". When an FCCU regenerator is operating in partial burn mode, the CO produced, a known pollutant, cannot be discharged untreated to the atmosphere. To remove the CO from the regenerator off gas and realize the benefits of recovering the heat associated with burning it, refiners typically burn the CO in the regenerator off gas with the assistance of added fuel and air in a burner usually referred to as "the CO boiler". The heat recovered by burning the CO is used to generate steam.

When the regenerator is operating in partial burn, the conditions in the regenerator, where the oxygen added with air has been depleted and CO concentration has built up, are overall reducing. That is, there is not enough oxygen to convert/burn all reducing species regardless if some oxygen is actually still present. Under these conditions, some of the nitrogen in the coke is converted to so called "gas phase reduced nitrogen species", examples of which are ammonia and HCN. Small amounts of $NO_x$ may also be present in the partial burn regenerator off gas. When these gas phase reduced nitrogen species are burnt in the CO boiler with the rest of the regenerator off gas, they can be oxidized to $NO_x$, which is then emitted to the atmosphere. This $NO_x$ along with any "thermal" $NO_x$ formed in the CO boiler burner by oxidizing atmospheric $N_2$ constitute the total $NO_x$ emissions of the FCCU unit operating in a partial or incomplete combustion mode.

FCCU regenerators may also be designed and operated in an "incomplete burn" mode intermediate between full burn and partial burn modes. An example of such an intermediate regime occurs when enough CO is generated in the FCCU regenerator to require the use of a CO boiler, but because the amounts of air added are large enough to bring the unit close to full burn operation mode, significant amounts of oxygen can be found in the off gas and large sections of the regenerator are actually operating under overall oxidizing conditions. In such case, while gas phase reduced nitrogen species are still found in the off gas, significant amounts of $NO_x$ are also present. In most cases, a majority of this $NO_x$ is not converted in the CO boiler and ends up being emitted to the atmosphere.

Yet another combustion mode of operating an FCCU, which can also be considered as an "incomplete burn" mode, is nominally in full burn with relatively low amounts of excess oxygen and/or inefficient mixing of air with coked catalyst. In this case, large sections of the regenerator may be under reducing conditions even if the overall regenerator is nominally oxidizing. Under these conditions, reduced nitrogen species and increased amounts of CO may be found in the regenerator off gas along with $NO_x$. These reduced nitrogen species can be converted to $NO_x$ in a downstream CO boiler before being emitted into the atmosphere.

Various catalytic approaches have been proposed to control $NO_x$ emissions in the flue gas exiting from the FCCU regenerator.

For example, recent patents, including U.S. Pat. Nos. 6,379,536, 6,280,607, 6,129,834 and 6,143,167, have proposed the use of $NO_x$ removal compositions for reducing $NO_x$ emissions from an FCCU regenerator. U.S. Pat. Nos. 6,358,881B1, 6,165,933 also disclose a $NO_x$ reduction composition, which promotes CO combustion during an FCC catalyst regeneration process step while simultaneously reducing the level of $NO_x$ emitted during the regeneration step. $NO_x$ reduction compositions disclosed by these patents may be used as an additive, which is circulated along with the FCC catalyst inventory, or incorporated as an integral part of the FCC catalyst.

In U.S. Pat. No. 4,290,878, $NO_x$ is controlled in the presence of a platinum-promoted CO combustion promoter in a full burn combustion mode regenerator by the addition of iridium or rhodium on the combustion promoter in lesser amounts than the amount of platinum.

U.S. Pat. Nos. 4,980,052 and 4,973,399 disclose copper-loaded zeolite additives useful for reducing emissions of $NO_x$ from the regenerator of an FCCU unit operating in full CO-burning mode.

U.S. Pat. No. 4,368,057 discloses the removal of $NH_3$ contaminants of gaseous fuel by reacting the $NH_3$ with a sufficient amount of NO.

Efforts to control ammonia and/or $NO_x$ released in an FCC regenerator operated in a partial or an incomplete mode of combustion have been known.

For example, recent patent, U.S. Pat. No. 6,660,683 B1 discloses compositions for reducing gas phase reduced nitrogen species, e.g. ammonia, and $NO_x$ generated during a partial or incomplete combustion catalytic cracking process. The compositions generally comprise (i) an acidic metal oxide containing substantially no zeolite, (ii) an alkali metal, alkaline earth metal and mixtures thereof, (iii) an oxygen storage component and (iv) a noble metal component, preferably rhodium or iridium, and mixtures thereof.

Publication No. US-2004-0074809-A1, published Apr. 22, 2004, discloses processes for the reduction of gas phase reduced nitrogen species, e.g. ammonia, in the off gas of an FCCU regenerator operated in a partial or incomplete mode of combustion. Reduced emissions are achieved by contacting the off gas from the FCCU regenerator with at least one oxidative catalyst/additive composition having the ability to reduce gas phase nitrogen species to molecular nitrogen under partial or incomplete combustion conditions.

U.S. Pat. No. 5,021,144 discloses reducing ammonia in an FCCU regenerator operating in a partial burn combustion mode by adding a significant excess (e.g., at least two times) of the amount of a carbon monoxide (CO) combustion or oxidation promoter sufficient to prevent afterburn combustion in the dilute phase of the regenerator.

U.S. Pat. No. 4,755,282 discloses a process for reducing the content of ammonia in a regeneration zone off gas of an FCCU regenerator operating in a partial or incomplete combustion mode. The process requires passing a fine sized, i.e. 10 to 40 microns, ammonia decomposition catalyst to either the regeneration zone of an FCCU, or an admixture with the off gas from the regeneration zone of the FCCU, at a predetermined make-up rate such that the residence time of the decomposition catalyst relative to the larger FCC catalyst particles will be short in the dense bed of the regenerator due to rapid elutriation of the fine sized ammonia decomposition catalyst particles. The fine sized elutriated decomposition catalyst particles are captured by a third stage cyclone separator and recycled to the regenerator of the FCCU. The decomposition catalyst may be a noble group metal dispersed on an inorganic support.

U.S. Pat. No. 4,744,962 is illustrative of a post-treatment process to reduce ammonia in the FCCU regenerator flue gas. The post-treatment involves treating the regenerator flue gas to lessen the ammonia content after the gas has exited the FCCU regenerator but before passage to the CO boiler.

Publication No. US 2004/0245148 A1, published Dec. 9, 2004, discloses reducing ammonia and hydrogen cyanide in a partial burn regenerator flue gas by incorporating precious metals such as ruthenium, rhodium, iridium or mixtures thereof, in the regenerator.

Simultaneously with $NO_x$ emissions, afterburn may also be a concern for units operating in partial burn or incomplete combustion mode. Gases exiting the catalyst bed of an FCCU operating in partial or incomplete burn combustion mode will consist mainly of $CO_2$, CO, $H_2O$, reduced nitrogen species, other reduced species such as $H_2S$, COS and hydrocarbons, $SO_2$, and potentially some $O_2$ and/or NO. However, depending on the design and mechanical condition of the regenerator, conditions can develop in which sufficient amounts of CO and $O_2$ escape the catalyst bed allowing the CO to react with the available $O_2$. This reaction can occur in the regenerator at any point downstream of the dense catalyst bed, including the area above the dense bed (dilute phase), the cyclones where entrained catalyst is separated from the flue gas, the plenum, the overhead space above the cyclones, or even the flue gas pipe. Because afterburn occurs after the dense bed of the cracking catalyst, which acts as a heat sink absorbing the heat released from the exothermic reaction of CO with $O_2$, it can heat up the gases to the point that overheating can occur. The result can be temperatures which approach the metallurgical limit of the materials used to construct the regenerator. High afterburn can limit the useful life of the regenerator equipment, and runaway afterburn can cause catastrophic equipment failure.

Typically, afterburn is prevented or controlled by adding CO combustion promoters to the cracking catalyst circulating inventory which promote the combustion of CO to $CO_2$. Conventional CO combustion promoters typically comprise an additive comprising 300 to 1000 ppm platinum on alumina, or a much smaller amount of platinum, e.g., amounts which typically achieve from about 0.1 to about 10 ppm in the total cracking catalyst inventory, incorporated directly into all or part of the cracking catalyst.

While CO combustion promoters can be effectively used to prevent or control afterburn in FCC units, the use of combustion promoters is not desirable in many of the FCC units operated in partial burn or incomplete combustion mode. By promoting the reaction of CO to $CO_2$ in an oxygen deficient environment, a combustion promoter can consume oxygen to convert CO, oxygen which otherwise would have been used to convert coke to CO, thereby increasing coke left on the regenerated catalyst (CRC). Increased amounts of CRC on the cracking catalyst returned to the riser will decrease the catalyst activity, and may reduce conversion and product yields. Any increase in the conversion of CO will also increase the heat released in the regenerator, a consequence of the larger heat of combustion for the reaction of CO to $CO_2$ compared to the heat of combustion for the reaction of carbon to CO. As a result increased CO conversion can raise the temperature of the dense catalyst bed. Increasing the dense bed temperature can often be undesirable, since higher regenerated catalyst temperature can negatively affect catalyst circulation, catalyst activity and stability, unit conversion and/or product yields. Thus, many of the FCC units operated in partial burn or incomplete combustion mode, cannot use any CO combustion promoter or any other additive having CO oxidation activity sufficient to be useful as a CO combustion promoter under catalytic cracking conditions.

Consequently, there remains a need in the refining industry for simple and effective compositions and processes which minimize the content of gas phase reduced nitrogen species and $NO_x$ in an FCCU regenerator operated in a partial or incomplete combustion mode during an FCC process without significantly affecting CO combustion.

SUMMARY OF THE INVENTION

The essence of the present invention resides in the discovery of particulate compositions which are capable of being circulated throughout an FCCU along with the cracking catalyst inventory to minimize the content of gas phase reduced nitrogen species, e.g. $NH_3$ and HCN, and $NO_x$ present in the off gas of the FCCU regenerator when the FCCU regenerator is operated in a partial or incomplete burn mode. Advantageously, the $NO_x$ reduction compositions of the invention exhibit low CO combustion activity, i.e., the compositions do not significantly affect CO combustion, simultaneously with high efficiencies for the oxidation of gas phase reduced nitrogen species to $N_2$ when the compositions are present in a FCCU regenerator operating under partial or incomplete burn mode. In accordance with the process of the invention, the gas phase reduced nitrogen species are oxidized to molecular nitrogen prior to passage of the off gas to the CO boiler. This reduced content of gas phase reduced nitrogen species in the off gas provides for an overall reduction of $NO_x$ emitted into the atmosphere from the FCCU due to a decrease in the amount of the nitrogen species being oxidized to $NO_x$ in the CO boiler as CO is oxidized to $CO_2$.

Despite the reducing environment in an FCCU regenerator operated in a partial burn or incomplete burn mode, some $NO_x$ may form in the regenerator. In addition to reducing the content of gas phase reduced nitrogen species, compositions of the invention also enhance the removal of any $NO_x$ formed in the partial or incomplete burn regenerator by catalyzing the reaction of $NO_x$ with reductants typically found in the FCCU regenerator, e.g. CO, hydrocarbons, and gas phase reduced nitrogen species, to form molecular nitrogen. Advantageously, the content of $NO_x$ formed in the regenerator is reduced prior to the $NO_x$ exiting the regenerator and being passed unabated through the CO boiler into the environment.

In accordance with the present invention, compositions of the invention are comprised of a particulate composition containing a zeolite component having a pore size of less than 7.2 Angstroms and at least one noble metal selected from the group consisting of platinum, palladium, rhodium, iridium, osmium, ruthenium, rhenium and mixtures thereof. In a preferred embodiment of the invention, the zeolite particles are bound with an inorganic binder. The binder preferably comprises silica, alumina or silica-alumina. Preferably, the zeolite is exchanged with hydrogen, ammonium, alkali metal and combinations thereof. The preferred alkali metal is sodium, potassium and combinations thereof.

In one embodiment of the invention, the zeolite containing compositions of the invention are added to a circulating inventory of the catalytic cracking catalyst as a separate admixture of particles to reduce $NO_x$ emissions released from the FCCU regenerator during the FCC process.

In another embodiment of the invention, the zeolite containing compositions of the invention are incorporated as an integral component of an FCC catalyst, preferably, containing a Y-type zeolite active cracking component.

The present invention also provides a process for reducing the content of gas phase reduced nitrogen species released from the regenerator of an FCCU operated in a partial or incomplete mode of combustion without significantly affecting CO combustion. In accordance with the present invention, the process comprises contacting the off gas of an FCCU regenerator operated in a partial or incomplete combustion mode under FCC catalytic conditions with an amount of the compositions of the invention effective to oxidize the gas phase reduced nitrogen species to molecular nitrogen. The invention also provides a process for reducing $NO_x$ emissions from an FCC process operated in a partial or incomplete combustion mode using the compositions of the invention.

Accordingly, it is an advantage of this invention to provide compositions which are useful to reduce the content of gas phase reduced nitrogen species released from an FCCU regenerator operating in partial or incomplete combustion mode during an FCC process.

It is also an advantage of this invention to provide compositions which are useful to reduce $NO_x$ emissions from an FCCU regenerator operating in partial or incomplete combustion mode by minimizing the amount of reduced nitrogen species emitted from the regenerator during an FCC process.

Another advantage of the invention is to provide low CO combustion compositions which are effective to reduce the content of gas phase reduced nitrogen species and $NO_x$ released from an FCCU regenerator operating in partial or incomplete combustion mode during an FCC process.

Another advantage of the invention is to provide compositions which are effective to oxidize gas phase reduced nitrogen species released from an FCCU regenerator operating in partial or incomplete combustion mode to molecular nitrogen, thereby minimizing the conversion of the reduced nitrogen species to $NO_x$ in the downstream CO boiler.

It is another advantage of this invention to provide compositions which are useful to reduce $NO_x$ emissions from an FCCU regenerator operating in partial or incomplete combustion mode to molecular nitrogen by catalyzing the reaction of $NO_x$ with CO and other reductants typically present in a partial or incomplete burn FCCU regenerator.

It is another advantage of this invention to provide a process for the reduction of the content of $NO_x$ in the off gas of an FCCU regenerator operating in partial or incomplete combustion mode by reducing the content of gas phase reduced nitrogen species being emitted in the off gas released from the regenerator, prior to passage of the gas to a CO boiler, whereby as CO is oxidized to $CO_2$, a lesser amount of the gas phase reduced nitrogen species is oxidized to $NO_x$.

It is another advantage of this invention to provide a process for the reduction of gas phase reduced nitrogen species in an effluent gas stream passed from an FCC regenerator to a CO boiler, whereby as CO is oxidized to $CO_2$ a lesser amount of the reduced nitrogen species is oxidized to $NO_x$.

Another advantage of this invention is to provide a process for the reduction of the content of $NO_x$ in the off gas of an FCCU regenerator operating in a partial or incomplete combustion mode by the reduction of $NO_x$ being emitted in the off gas released from the regenerator, prior to passage of the gas to the CO boiler where the $NO_x$ remains untreated and is eventually released into the environment.

Yet another advantage of this invention is to provide improved partial or incomplete combustion FCC processes using the compositions of the invention.

These and other aspects of the present invention are described in further detail below.

DETAILED DESCRIPTION OF THE INVENTION

Figure 1:
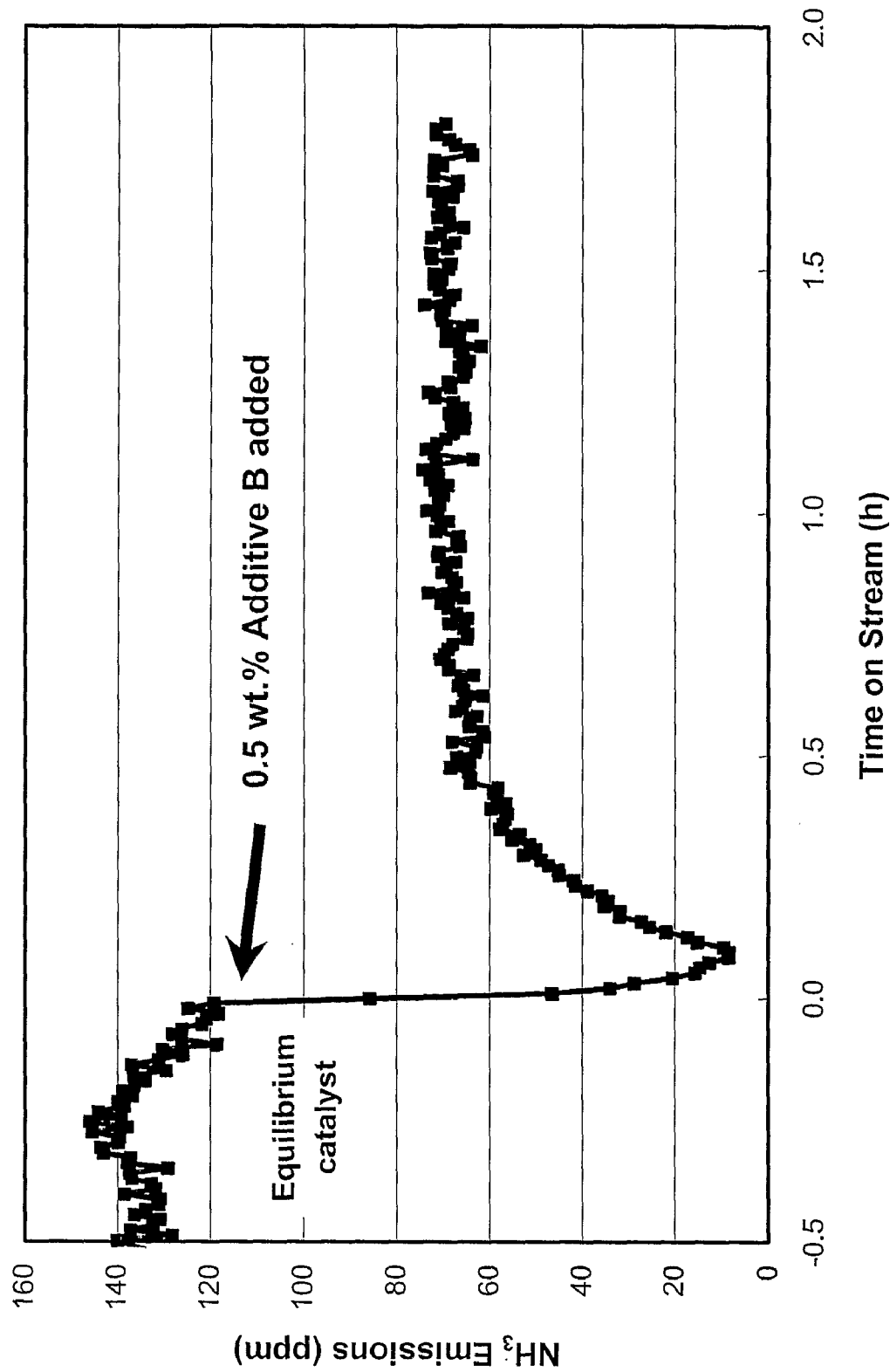
FIG. 1 is a graphic representation of the effectiveness of Additive B, as prepared in EXAMPLE 2, for reducing $NH_3$ in a Davison Circulating Riser ("DCR") regenerator operating under partial burn conditions when the additive is blended with an equilibrium cracking catalyst.

For purposes of this invention the term "$NO_x$" will be used herein to represent oxides of nitrogen, e.g. nitric oxide, (NO) and nitrogen dioxide ($NO_2$) the principal noxious oxides of nitrogen, as well as $N_2O_4$, $N_2O_5$, and mixtures thereof.

The term reduced "gas phase reduced nitrogen species" is used herein to indicate any gas phase species formed in the regenerator of a fluid catalytic cracking unit during a fluid catalytic cracking process which gas species contains a nitrogen having a nominal charge of less than zero. Examples of gas phase reduced nitrogen species include, but are not limited to, ammonia ($NH_3$), hydrogen cyanide (HCN), and the like.

The term "afterburn" is used herein to indicate the burning of CO which occurs when CO and $O_2$ escaping the dense bed of fluidized cracking catalyst being regenerated in a FCCU regenerator react at any point after the dense catalyst bed, including the area immediately above the dense bed (dilute phase), the cyclones where entrained catalyst is separated from the flue gas, the plenum, overhead above the cyclones, or even the flue gas pipe. Afterburn is measured as the difference between any of the temperatures measured after the regenerator dense bed, or the average of all or any group of such temperatures measured (e.g., dilute phase, cyclone, plenum, overhead, or flue gas temperatures and the like) minus any of the dense bed temperatures or the average of all or any group of dense bed temperatures measured.

For purposes of this invention the term "low CO combustion or oxidation" as it relates to a composition of matter, is used herein to indicate a composition which does not significantly affect CO oxidation or combustion or does not have sufficient CO combustion or promotion activity to be useful as a CO combustion promoter in an FCCU operating under FCC conditions, so that the composition has to be used in an amount of at least twice, preferably at least three times, more preferably at least five times, and even more preferably at least ten times the amount of a conventional CO combustion promoter consisting of about 700 to about 850 ppm of platinum on an alumina base, in order to obtain similar control of afterburn achieved with a conventional CO combustion promoter.

The present invention encompasses the discovery that the use of certain zeolite containing additive compositions is very effective to reduce $NO_x$ by oxidizing gas phase reduced nitrogen species released from the FCCU regenerator under FCC process conditions to $N_2$, so as to prevent the formation of $NO_x$ in a downstream CO boiler. Compositions of the invention accomplish $NO_x$ reduction without a substantial change in hydrocarbon feed conversion or the yield of cracked products. The $NO_x$ reduction compositions of the present invention typically have low CO combustion or oxidation activity under partial or incomplete burn conditions and do not provide sufficient CO promotion activity to be useful in an FCCU regenerator as a CO combustion promoter.

Compositions of the invention typically comprise a composition containing particles of a zeolite component wherein the zeolite has a pore size of less than 7.2 Angstroms and at least one noble metal selected from the group consisting of platinum, palladium, rhodium, iridium, osmium, ruthenium, rhenium and mixtures thereof, with rhodium, iridium, osmium, ruthenium, rhenium and mixtures thereof being preferred, and rhodium, iridium and mixtures thereof being most preferred. In a preferred embodiment of the invention, the zeolite containing particles are bound with an inorganic binder. The novel compositions may be added to the circulating inventory of the catalytic cracking catalyst as a separate particle additive or incorporated as an integral component into the cracking catalyst.

Zeolites useful in the present invention include zeolites having a pore size of less than 7.2 Angstroms, preferably ranging from about 2 to about 7.1 Angstroms, most preferably ranging from about 3.5 to about 6.5 Angstroms with a $SiO_2$ to $Al_2O_3$ molar ratio of less than about 500, preferably less than 250, most preferably less than 100. Preferably, the zeolite component is a zeolite selected from the group consisting of ZSM-11, beta, MCM-49, mordenite, MCM-56, Zeolite-L, zeolite Rho, errionite, chabazite, clinoptilolite, MCM-22, MCM-35, MCM-61, Offretite, A, ZSM-12, ZSM-23, ZSM-18, ZSM-22, ZSM-35, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelinite, Gismondine, Cancrinite, Brewsterite, Stilbite, Paulingite, Goosecreekite, Natrolite, omega, ferrierite or mixtures thereof. In a more preferred embodiment of the invention, the $NO_x$ reduction zeolite component is a zeolite selected from the group consisting of ferrierite, beta, MCM-49, mordenite, MCM-56, zeolite Rho, errionite, chabazite, clinoptilolite, MCM-22, Offretite, A, ZSM-12, ZSM-23, omega and mixtures thereof. In an even more preferred embodiment of the invention, the $NO_x$ reduction zeolite component is ferrierite.

In a preferred embodiment of the invention, the zeolite component has a surface area of at least 100 $m^2/g$, preferably at least 200 $m^2/g$ and most preferably at least 300 $m^2/g$. In another embodiment of the invention, the zeolite component is exchanged with a material selected from the group consisting of hydrogen, ammonium, alkali metal and combinations thereof, prior to incorporation into the binder or FCC catalyst. The preferred alkali metal is one selected from the group consisting of sodium, potassium and mixtures thereof.

Optionally, the zeolite component may contain stabilizing amounts, e.g., up to about 25 weight percent, of a stabilizing metal (or metal ion), preferably incorporated into the pores of the zeolite. Suitable stabilizing metals include, but are not limited to, metals selected from the group consisting of Groups 1B, 2A, 3B, 4B, 5B, 6B, 7B, 2B 3A, 4A, 5A and the Lanthanide Series of The Periodic Table, nickel, iron cobalt and mixtures thereof. Preferably, the stabilizing metals are selected from the group consisting of Groups 1B, 3B, 2A, 2B, 3A and the Lanthanide Series of the Periodic Table, iron and mixtures thereof. Most preferably, the stabilizing metals are selected from the group consisting of lanthanum, aluminum, magnesium, zinc, iron, copper and mixtures thereof. The metal may be incorporated into the pores of the $NO_x$ reduction zeolite by any method known in the art, e.g., ion exchange, impregnation or the like. For purposes of this invention, the Periodic Table referenced herein above is the Periodic Table as published by the American Chemical Society.

The amount of the zeolite component used in the $NO_x$ reduction compositions of the invention will vary depending upon several factors, including but not limited to, the mode of combining the zeolite with the catalytic cracking catalyst and the type of cracking catalyst used. In one embodiment of the invention, the compositions of the invention are separate catalyst/additive compositions and comprise a particulate composition formed by binding particles of a zeolite component with a suitable inorganic binder. Generally, the amount of the zeolite component present in the particulate compositions of the invention is at least 10, preferably at least 30, most preferably at least 40 and even more preferably at least 50, weight percent based on the total weight of the composition. Typically, the particulate $NO_x$ reduction compositions of the invention contain from about 10 to about 85, preferably from about 30 to about 80, most preferably, from about 40 to about 75, weight percent of the zeolite component based on the total weight of the $NO_x$ reduction composition.

Binder materials useful to prepare the particulate compositions of the invention include any inorganic binder which is capable of binding a zeolite powder to form particles having properties suitable for use in the FCCU under FCC process conditions. Typical inorganic binder materials useful to prepare compositions in accordance with the present invention include, but are not limited to, alumina, silica, silica-alumina, aluminum phosphate and the like, and mixtures thereof. Preferably, the binder is selected from the group consisting of alumina, silica, silica-alumina and mixtures thereof. More preferably, the binder comprises alumina. Even more preferably, the binder comprises an acid or base peptized alumina. Most preferably, the binder comprises an alumina sol, e.g., aluminum chlorohydrol. Generally, the amount of binder material present in the particulate catalyst/additive compositions comprises from about 5 to about 50 weight percent, preferably from about 10 to about 30 weight percent, most preferably from about 15 to about 25 weight percent, of the catalyst/additive composition of the invention.

Particulate $NO_x$ reduction compositions of the invention should have a particle size sufficient to permit the composition to be circulated throughout the FCCU simultaneously with the inventory of cracking catalyst during the FCC process. Typically, the composition of the invention will have a mean particle size of greater than 45 μm. Preferably, the mean particle size is from about 50 to about 200 μm, most preferably from about 55 to about 150 μm, even more preferred from about 60 to about 120 μm. The compositions of the invention typically have a Davison attrition index (DI) value of less than 50, preferably less than 20, most preferably less than 15.

While the present invention is not limited to any particular process of preparation, typically the particulate compositions of the invention are prepared by forming an aqueous slurry containing the zeolite, optional zeolite components, the inorganic binder, and optional matrix materials, in an amount sufficient to provide at least 10.0 weight percent of zeolite and at least 5.0 weight percent of binder material in the final catalyst/additive composition and, thereafter, spray drying the aqueous slurry to form particles. The spray-dried particles are optionally dried at a sufficient temperature for a sufficient time to remove volatiles, e.g., at about 90° C. to about 320° C. for up to about 24 hours. In a preferred embodiment of the invention, the zeolite containing aqueous slurry is milled prior to spray-drying to reduce the mean particle size of materials contained in the slurry to 10 μm or less, preferably 5 μm or less, most preferably 3 μm or less. The aqueous slurry may be milled prior to or after incorporation of the binder and/or matrix materials as desired.

The spray-dried composition may be calcined at a temperature and for a time sufficient to remove volatiles and provide sufficient hardness to the binder for use in the FCCU under FCC process conditions, preferably from about 320° C. to about 900° C. from about 0.5 to about 12 hours.

Optionally, the dried or calcined composition is washed or exchanged with an aqueous solution of ammonia or ammonium salt (e.g., ammonium sulfate, nitrate, chloride, carbonate, phosphate and the like), or an inorganic or organic acid (e.g., sulfuric, nitric, phosphoric, hydrochloric, acetic, formic and the like) to reduce the amount of alkaline metals, e.g. sodium or potassium.

Typically, particulate $NO_x$ reduction compositions useful in the process of the present invention are prepared by impregnating the base zeolite containing material with an aqueous solution of at least one noble metal salt, e.g. nitrate, chloride, carbonate and sulfate salts, amine complexes, and the like, in an amount sufficient to provide at least 0.1 parts per million of noble metal, measured as the metal, in the final catalyst/additive composition and thereafter drying the impregnated particles to remove volatiles, e.g. typically at about 100° C. to 250° C. for up to about 24 hours.

The amount of the $NO_x$ reduction compositions used in the process of the invention is any amount sufficient to reduce the content of gas phase reduced nitrogen species in the flue gas of an FCCU regenerator operated in a partial or incomplete mode of combustion relative to the content of gas phase reduced nitrogen species present in the flue gas absent the presence of the $NO_x$ reduction compositions. Particulate $NO_x$ reduction compositions useful in the invention process are circulated in the form of separate particle additives along with the main cracking catalyst throughout the FCCU. Generally, the $NO_x$ reduction composition is used in an amount of at least 0.01, preferably at least 0.05, most preferably at least 0.1, weight percent of the FCC catalyst inventory. The amount of the $NO_x$ reduction composition used ranges from about 0.01 to about 50 weight percent, preferably from about 0.05 to about 30 weight percent, most preferably from about 0.1 to about 20 weight percent of the FCC catalyst inventory. The separate particles may be added to the FCCU in any conventional manner, e.g., with make-up catalyst to the regenerator or other convenient method.

Where compositions of the invention are integrated into the FCC catalyst particles themselves, any conventional FCC catalyst particle component may be used in combination with the compositions of the invention. When integrated into the FCC catalyst composition, the $NO_x$ reduction composition of the invention typically represents at least about 0.005 wt %, preferably at least about 0.01 wt %, most preferably at least about 0.05 wt %, of the total FCC catalyst composition. Preferably, the amount of the invention compositions used ranges from about 0.005 to about 50 wt %, more preferable from about 0.01 to about 30 weight percent, most preferably from about 0.05 to about 20 wt %, of the total FCC catalyst composition. When incorporated as an integral component of the FCC catalyst composition, the $NO_x$ reducing zeolite component typically represents at least 0.005 wt % of the total FCC catalyst composition. Preferably, the amount of the $NO_x$ reducing zeolite used ranges from about 0.005 to about 50 wt %, most preferably from about 0.05 to about 20 wt %, of the total FCC catalyst composition In addition to the $NO_x$ reducing zeolite and the noble metal component, the integrated FCC catalyst will typically comprise the cracking catalyst zeolite, inorganic binder materials and optionally, matrix, fillers, and other additive components such as metals traps (for example, traps for Ni and V) to make up the cracking catalyst. The cracking catalyst zeolite, usually a Y, USY or REUSY-type, provides the majority of the cracking activity and is typically present in a range from about 10 to about 75, preferably from about 15 to about 60 and most preferably from about 20 to about 50 weight percent based on the total weight of the composition. Inorganic binder materials useful to prepare integrated catalyst compositions in accordance with the present invention include any inorganic material capable of binding the components of the integrated catalyst to form particles having properties suitable for use in the FCCU under FCC process conditions. Typically, the inorganic binder materials include, but are not limited to, alumina, silica, silica-alumina, aluminum phosphate and the like, and mixtures thereof. Preferably, the binder is selected from the group consisting of alumina, silica, silica-alumina. Generally, the amount of binder material present in the integrated catalyst composition is less than 50 weight percent, based on the total weight of the catalyst composition. Preferably, the amount of binder material present in the integrated catalyst composition ranges from about 5 to about 45 weight percent, most preferably from about 10 to about 30 weight percent and even more preferably from about 15 to about 25 weight percent, based on the total weight of the composition.

The matrix materials optionally present in the integrated catalyst compositions of the present invention include, but are not limited to alumina, silica-alumina, rare earth oxides such as lanthana, transition metal oxides such as titania, zirconia, and manganese oxide, Group IIA oxides such as magnesium and barium oxides, clays such as kaolin, and mixtures thereof. The matrix or fillers may be present in the integral catalyst in the amount of less than 50 weight percent based on the total weight of the composition. Preferably, the matrix and fillers, if any, are present in an amount ranging from about 1 to about 45 weight present based on the total weight of the catalyst composition.

The particle size and attrition properties of the integral catalyst affect fluidization properties in the unit and determine how well the catalyst is retained in the commercial FCC unit. The integral catalyst composition of the invention typically has a mean particle size of about 45 to about 200 µm, more preferably from about 50 µm to about 150 µm. The attrition properties of the integral catalyst, as measured by the Davison Attrition Index (DI), have a DI value of less than 50, more preferably less than 20 and most preferably less than 15.

In a preferred embodiment of the invention, the FCC cracking catalyst contains a Y-type zeolite. The $NO_x$ reduction zeolite containing compositions may be added as a separate additive particle to a circulating inventory of the cracking catalyst or incorporated directly into the Y-type zeolite containing cracking catalyst as an integral component of the catalyst. In either case, it is preferred that the zeolite be present in that amount sufficient to provide in the total catalyst inventory a ratio of $NO_x$ reduction zeolite to Y-type zeolite of less than 2, preferably less than 1.

In general, the noble metal component is at least one metal selected from the group consisting of platinum, palladium iridium, rhodium, osmium, or ruthenium, rhenium, and mixtures thereof. Preferably, the noble metal component is selected from the group consisting of iridium, rhodium, osmium, ruthenium, rhenium and mixtures thereof. Most preferably, the noble metal component is rhodium, iridium and mixtures thereof. Typically, the amount of the noble metal component useful in the present invention, calculated as the metal, is at least 0.1 parts per million, preferably at least 0.5 parts per million, most preferably at least 1.0 part per million. In a preferred embodiment of the invention, the amount of the noble metal component ranges from about 0.1 parts per million to about 1.0 wt %, preferably from about 0.5 parts per million to about 5,000 parts per million, most preferably from about 1.0 part per million to about 2,500 parts per million, based on the total weight of the $NO_x$ reduction composition.

The noble metal component may be added as a component of the $NO_x$ reduction composition using any method known in the art, e.g., ion exchange, impregnation and the like. The noble metal component may be added to the $NO_x$ reducing zeolite prior to incorporation into the $NO_x$ reduction composition. In the alternative, the noble metal component may be added to particles incorporating the $NO_x$ reducing zeolite to form a particulate $NO_x$ reduction composition as described herein above, or to integral catalyst particles comprising the $NO_x$ reducing composition and components of the FCC cracking catalyst. Suitable sources of the noble metal and the optional stabilizing component include aqueous solutions of nitrate, chloride, carbonate and sulfate salts, amine complexes, and the like. The salts or complexes are used in an amount sufficient to provide at least 0.1 parts per million of the noble metal, measured as the metal, in the final composition. Thereafter the composition is dried or calcined to remove volatiles, e.g., drying at about 100° C. to about 250° C. for up to 24 hours or calcining at about 250° C. to about 900° C. for up to about 12 hours.

Additional materials optionally present in the compositions of the present invention include, but are not limited to, fillers (e.g., kaolin clay) or matrix materials (e.g., alumina, silica, silica-alumina, yttria, lanthana, ceria, neodymia, samaria, europia, gadolinia, titania, zirconia, praseodymia and mixtures thereof). When used, the additional materials are used in an amount which does not significantly adversely affect the performance of the compositions to reduce $NO_x$ emissions released from the FCCU regenerator under FCC conditions. In general, the additional materials will comprise no more than about 70 weight percent of the compositions. It is preferred, however, that the $NO_x$ reduction compositions of the invention consist essentially of the $NO_x$ reducing zeolite, at least one noble metal and an inorganic binder.

It is also within the scope of the invention to include additional zeolite components in the $NO_x$ reduction compositions of the invention. The additional zeolite component may be any zeolite which does not adversely affect the performance of the composition to minimize the amount of gas phase reduction nitrogen species in the FCCU regenerator during an FCC process. Preferably, the additional zeolite component is ZSM-5. Typically, the additional zeolite component is used in an amount ranging from about 1 to about 80, preferably from about 10 to about 70, weight percent of the catalyst/additive compositions. Where the $NO_x$ reduction zeolite is used as an integral component of the catalyst, the additional zeolite component is preferably used in an amount ranging from about 0.1 to about 60, most preferably from about 1 to about 40, weight percent of the catalyst composition.

It is further within the scope of the present invention to include in the process and composition of the invention other additives conventionally used in FCC process, e.g., $SO_x$ reduction additives, $NO_x$ reduction additives, gasoline sulfur reduction additives, CO combustion promoters, additives for the production of light olefins, and the like.

Somewhat briefly, the FCC process involves the cracking of heavy hydrocarbon feedstocks to lighter products by contacting the feedstock in a cyclic catalyst recirculation cracking process with a circulating fluidizable catalytic cracking catalyst inventory consisting of particles having a mean particle size ranging from about 50 to about 150 µm, preferably from about 60 to about 120 µm. The catalytic cracking of these relatively high molecular weight hydrocarbon feedstocks result in the production of a hydrocarbon product of lower molecular weight. The significant steps in the cyclic FCC process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is oxidatively regenerated in a catalyst regeneration zone to produce hot, regenerated catalyst which is then recycled to the cracking zone for cracking further quantities of feed.

Conventional FCC catalysts include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica-alumina, a Y type zeolite acid site active component, one or more matrix aluminas and/or silica-aluminas, and fillers such as kaolin clay. The Y zeolite may be present in one or more forms and may have been ultra stabilized and/or treated with stabilizing cations such as any of the rare earths.

Typical FCC processes are conducted at reaction temperatures of 480° C. to 600° C. with catalyst regeneration temperatures of 600° C. to 800° C. As it is well known in the art, the catalyst regeneration zone may consist of a single or multiple reactor vessels. The compositions of the invention may be used in FCC processing of any typical hydrocarbon feedstock. Suitable feedstocks include petroleum distillates or residuals of crude oils, which, when catalytically cracked, provide a gasoline or a gas oil product. Synthetic feeds having boiling points of about 204° C. to about 816° C., such as oil from coal, tar sands or shale oil, can also be included.

In order to remove coke from the catalyst, oxygen or air is added to the regeneration zone. This is performed by a suitable sparging device in the bottom of the regeneration zone, or if desired, additional oxygen is added to the dilute phase of the regeneration zone. In the present invention, an under-stoichiometric quantity of oxygen is provided to operate the regeneration zone in a partial or incomplete combustion mode. For purposes of this invention, the regeneration zone is operated in a partial or incomplete combustion mode, when any one of the following conditions is satisfied: (1) there is not sufficient air or oxygen added to the regenerator to convert all the carbon, hydrogen, sulfur and nitrogen in the coke on the spent cracking catalyst to $CO_2$, $H_2O$, $SO_2$ and NO, (2) the effluent from the regenerator does not contain enough oxygen to convert all CO and any other reduced nitrogen or sulfur species and hydrocarbons in the regenerator effluent to $CO_2$, $H_2O$, $SO_2$ and NO; and/or (3) sufficient amount of CO is present in the regenerator effluent to require the use of a CO boiler to treat the regenerator effluent and convert the CO contained in the effluent to $CO_2$ before having the FCCU regenerator effluent discharged into the atmosphere.

The presence of the compositions in accordance with the invention during the catalyst regeneration step dramatically reduces the emissions of gas phase reduced nitrogen species in the FCCU regenerator effluent. By removing the gas phase reduced nitrogen species from the effluent of the FCCU regenerator, significant reduction of $NO_x$ emissions from the CO boiler is achieved. In some cases, $NO_x$ reduction up to 90% is readily achievable using the compositions and method of the invention. However, as will be understood by one skilled in the catalyst art, the extent of reduced nitrogen species and $NO_x$ reduction will depend on such factors as, for example, the composition and amount of the additive utilized; the design and the manner in which the catalytic cracking unit is operated, including but not limited to, the amount of oxygen used and distribution of air in the regenerator, catalyst bed depth in the regenerator, stripper operation and regenerator temperature, the properties of the hydrocarbon feedstock cracked, the presence of other catalytic additives that may affect the chemistry and operation of the regenerator, and the design and operation of the CO boiler which impacts the conversion of reduced nitrogen species to $NO_x$ and the formation of thermal $NO_x$. Thus, since each FCCU is different in some or all of these respects, the effectiveness of the process of the invention may be expected to vary from unit to unit. $NO_x$ reduction compositions of the invention also prevent a significant increase in the production of coke during the FCC process, e.g., less than 20%, preferably less than 10%, relative to the production of coke absent the NOx reduction composition.

It is further expected that overall $NO_x$ emissions will be advantageously even lower when the invention is used in combination with a CO boiler designed to make the lowest amount of thermal $NO_x$ practical. Typical FCC CO boilers are older technology and are not optimized for minimum thermal $NO_x$ emissions. However they can be replaced or retrofitted with upgrades to state-of-the-art low $NO_x$ designs, including retrofitting with low $NO_x$ burners. Low $NO_x$ burner design approaches and features are described e.g., in appropriate sections in "The John Zink Combustion Handbook", editor, Charles E. Baulkal, Jr., published by the CRC Press, 2001, which descriptions are herein incorporated by reference. The formation of $NO_x$ is minimized by avoiding both high temperature and high excess oxygen zones using flame back mixing, exhaust gas recycle to the burner make-up air, staged fuel injection, intense swirl mixing of air and fuel, longer cooler flames, and various combinations of any or all of these design strategies. The present invention enables the benefits of low $NO_x$ burner technology to be realized from an FCC CO boiler so modified, by minimizing the reduced nitrogen species available to be oxidized therein to $NO_x$. The result is a new low $NO_x$ partial or incomplete burn FCC system that can eliminate the need for capital and operating cost-intensive systems like SCR, SNCR, scrubbers, and other approaches known in the art.

To further illustrate the present invention and the advantages thereof, the following specific examples are given. The examples are given as specific illustrations of the claimed invention. It should be understood, however, that the invention is not limited to the specific details set forth in the examples.

All parts and percentages in the examples as well as the remainder of the specification which refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Example 1

A composition comprising 75% ferrierite and 25% alumina sol (Additive A) was prepared as follows. An aqueous slurry was prepared which contained 6521 g of aluminum chlorohydrol solution (23% solids), 4500 g (dry basis) of ferrierite ($SiO_2/Al_2O_3$=20, $Na_2O+K_2O$<0.2) and enough additional water to make a slurry which contained about 40% solids. The slurry was milled, in a Drais mill, to an average particle size of less than 2.5 μm and then spray dried in a Bowen spray dryer. The spray dried product was calcined for 90 minutes at 593° C. This sample was designated as Additive A and the properties of this additive are shown in Table 1.

Example 2

About 158 g of Additive A was placed in an inclined beaker on a mechanical rotator. A master Rh solution was prepared by diluting 1.001 g Rh from nitrate salt (9% Rh) to 100 g with DI water. The calcined product was then impregnated by gradually spraying on it 16.7 g of the dilute Rh solution further diluted with 75 g DI water, targeting a concentration of 100 ppm Rh on the finished catalyst. The wet impregnated catalyst was dried for 1 hour at 99° C. and then calcined for 1 hour at 593° C. The finished catalyst was designated Additive B.

Example 3

Additive C was prepared using ferrierite which contained Na and K cations (about 1.02% $Na_2O$ and 7.08% $K_2O$). An aqueous slurry was prepared which contained 41% solids. The solids in the slurry consisted of 75% ferrierite (sodium and potassium content not included) and 25% alumina from an aluminum chlorohydrol solution (23% solids). The slurry was milled to an average particle size of less than 2.5 μm and then spray-dried. The spray dried product was calcined for about 1 hour at about 425° C. and then washed with sufficient amount of an aqueous ammonium sulfate solution (30% $(NH_4)_2SO_4$) to reduce the sodium and potassium content. The washed product was then flash-dried and stored. The final product had the properties shown in Table 2.

Example 4

Additive C was impregnated with Rh, dried and calcined using the same procedure described in Example 2 except that the amount of additive C used was 200 g (dry basis), and the impregnating solution was made with 0.165 g of a rhodium nitrate solution (12.11% Rh) and 180 g of DI water. The finished catalyst was designated as Additive D, contained 92 ppm Rh, 66% $SiO_2$, 33.6% $Al_2O_3$, 0.15% $Na_2O$, 0.7% $K_2O$, 1.5% $SO_4$, and had a surface area of 301 m²/g.

TABLE 1

| Properties of Additive A | | |
|---|---|---|
| $Al_2O_3$ | % | 28.3 |
| $Na_2O$ | % | 0.09 |
| $RE_2O_3$ | % | 0.08 |
| $SiO_2$ | % | 71.4 |
| $SO_4$ | % | 0.01 |
| Surface Area | m²/g | 328 |
| Zeolite Surface Area | m²/g | 259 |

TABLE 2

| Properties of Additive C | | |
|---|---|---|
| $Al_2O_3$ | % | 33 |
| $Na_2O$ | % | 0.15 |
| $RE_2O_3$ | % | 0.4 |
| $SiO_2$ | % | 67 |
| $SO_4$ | % | 1.5 |
| $K_2O$ | % | 0.7 |
| Surface Area | m²/g | 298 |
| Zeolite Surface Area | m²/g | 247 |

Example 5

Additive E was prepared by taking a sample of 80 g of Additive C and impregnating the sample to a target of 200 ppm Ir by incipient wetness using a dilute solution of 0.029 g of pentamine chloro iridium (III) dichloride (49.9% Ir in the salt) and 61 g DI water. The impregnated catalyst was dried at 120° C. overnight and calcined for 2 hours at 649° C.

Example 6

Additive F was prepared by taking a sample of 80 g of Additive C and impregnating the sample to a target of 200 ppm Pt by incipient wetness using a dilute solution of 0.503 g platinum tetramine nitrate solution (2.9% Pt) and 61 g of DI water. The impregnated catalyst was dried at 120° C. overnight and calcined for 2 hours at 649° C.

Example 7

Additive G was prepared by taking a sample of 109 g of Additive C and impregnating the sample to a target of 100 ppm Pd by incipient wetness using 0.118 g of a palladium nitrate solution (8.46% Pd) and 83 g of DI water. The impregnated catalyst was dried at 120° C. overnight and calcined for 2 hours at 649° C.

Example 8

Additive H was prepared by taking a sample of 109 g of Additive C and impregnating the sample to a target of 100 ppm Ru by incipient wetness using 0.667 g of a ruthenium nitrosyl nitrate solution (1.5% Ru) and 83 g DI water. The impregnated catalyst was dried at 120° C. overnight and calcined for 2 hours at 649° C.

Example 9

Additive I was prepared by taking a sample of 109 g of Additive A and impregnating the sample to a target of 100 ppm Rh and 50 ppm Ir by incipient wetness using 0.083 g of rhodium nitrate solution (12.11% Rh), 0.010 g of pentamine chloro iridium (III) dichloride (49.9% Ir in the salt) and 83 g DI water. The impregnated catalyst was dried at 120° C. overnight and calcined for 2 hours at 649° C.

Example 10

Additive J was prepared by impregnating 45.35 kg of Additive C with 100 ppm Rh as follows: Additive C was placed in an Eirich mixer and then impregnated with a Rh solution containing 36 g of a rhodium nitrate solution (11.4% Rh) and 20.4 kg of water. The impregnated material was then dried overnight at 149° C. and finally calcined at 593° C. for 1 hour. The final Additive J contained 93 ppm Rh, 64% $SiO_2$, 32.2% $Al_2O_3$, 0.17% $Na_2O$, 0.7% $K_2O$, 1.4% $SO_4$, and had a surface area of 292 $m^2/g$.

Example 11

The activity of Additive B for reducing $NH_3$ emissions from an FCC unit was evaluated by using the Davison Circulating Riser (DCR). The description of the DCR has been published in: (a) G. W. Young, G. D. Weatherbee, and S. W. Davey, "Simulating Commercial FCCU yields with the Davison Circulating Riser (DCR) pilot plant unit," National Petroleum Refiners Association (NPRA) Paper AM88-52; and (b) G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis Volume 76, p. 257, Elsevier Science Publishers B.V., Amsterdam 1993, ISBN 0-444-89037-8, which descriptions are herein incorporated by reference. A commercial FCC feed having the properties shown in Table 3 was used for these tests. The DCR was initially charged with approximately 1900 g of an equilibrium cracking catalyst having the properties shown in Table 4. The DCR regenerator was operated at 705° C. and the air flow rate was adjusted so as to achieve a $CO_2/CO$ ratio of 7.0 and virtually no $O_2$ in the regenerator flue gas. After stabilization of the unit, the baseline $NH_3$ emissions data were collected using a MKS Online Products FTIR multigas analyzer (model 2030). Subsequently, 100 g of a blend containing 10 g of Additive B and 90 g of the equilibrium cracking catalyst was injected into the DCR and $NH_3$ emissions were continuously collected for about 1.5 hours. No increase in NO emissions was detected upon injection of Additive B. Also no other nitrogen oxides (e.g., $NO_2$ or $N_2O$) were detected during this test. As shown in FIG. 1 and Table 5, Additive B is effective in reducing $NH_3$ emissions even when used at 0.5 wt. % of the overall catalyst inventory. These data demonstrate that Additive B is very efficient at converting reduced nitrogen species to molecular $N_2$ in the FCC unit regenerator.

TABLE 3

Properties of the FCC feed used in DCR tests of Examples 11 and 13

| | |
|---|---|
| API Gravity @60° F. | 23.2 |
| Sulfur, wt. % | 0.02 |
| Total Nitrogen, wt. % | 0.13 |
| Basic Nitrogen, wt. % | 0.04 |
| Conradson Carbon, wt. % | 0.03 |
| K Factor | 11.40 |
| Simulated Distillation, vol. % at ° F. | |
| 5 | 453 |
| 20 | 576 |
| 40 | 660 |
| 60 | 743 |

TABLE 3-continued

Properties of the FCC feed used in DCR tests of Examples 11 and 13

| | |
|---|---|
| 80 | 838 |
| Final Boiling Point | 1153 |

TABLE 4

Properties of equilibrium cracking catalyst used in the DCR test of Example 11

| | | |
|---|---|---|
| $SiO_2$ | wt. % | 49.01 |
| $Al_2O_3$ | wt. % | 46.05 |
| $RE_2O_3$ | wt. % | 1.44 |
| $Na_2O$ | wt. % | 0.32 |
| $TiO_2$ | wt. % | 1.16 |
| Ni | ppm | 1060 |
| V | ppm | 1760 |
| Sb | ppm | 270 |
| SA | $m^2/g$ | 174 |
| Zeolite | $m^2/g$ | 127 |

TABLE 5

$NH_3$ reduction by Additive B in the DCR regenerator operating in partial burn mode

| Additive Level (wt. %) | Average $NH_3$ emissions with equilibrium catalyst (ppmv) | $NH_3$ emissions after 1.5 hours on-stream with Additive B (ppmv) | $NH_3$ reduction (%) |
|---|---|---|---|
| 0.5 | 128 | 69 | 46 |

Example 12

Figure 2:
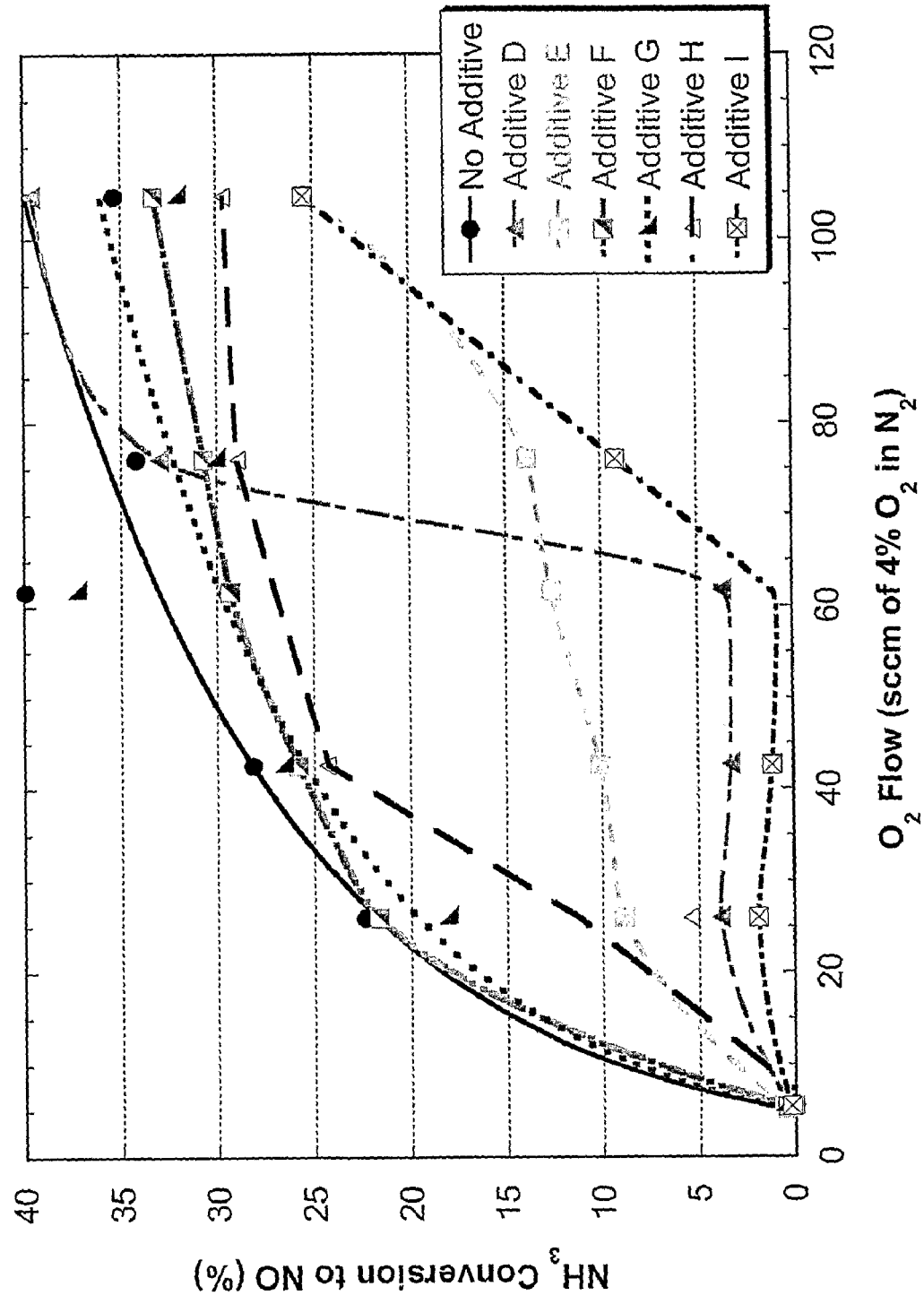
FIG. 2 is a graphic representation of the effectiveness of Additives D, E, F, G, H and I, as prepared in EXAMPLES 4, 5, 6, 7, 8 and 9 respectively, to reduce NO formation during $NH_3$ conversion in a Regenerator Test Unit ("RTU").

The activity of Additives D through I to reduce $NH_3$ emissions from an FCC unit regenerator operating in partial burn or incomplete combustion was compared to the activity of the cracking catalyst alone. The experiments were conducted by reacting $NH_3$ with CO at various levels of $O_2$ in a Regenerator Test Unit (RTU). The RTU is a lab-scale reactor system specifically designed to simulate the operation of a FCC unit regenerator. The RTU is described in detail in G. Yaluris and A. W. Peters "Studying the Chemistry of the FCCU Regenerator Under Realistic Conditions," Designing Transportation Fuels for a Cleaner Environment, J. G. Reynolds and M. R. Khan, eds., p. 151, Taylor & Francis, 1999, ISBN: 1-56032-813-4, which description is herein incorporated by reference. After calcination for 2 hours at 593° C., each additive was blended at 0.5 wt % level with a commercially available FCC catalyst (OCTACAT®-DCH, obtained from Grace Davison), which had been deactivated for 4 hours at 816° C. in a fluidized bed reactor with 100% stream. The cracking catalyst alone, or the additive/cracking catalyst blend was fed to the RTU reactor operating at 700° C. The gas feed to the RTU was a mixture of $NH_3$ and CO containing approximately 500 ppm $NH_3$, 5000-5500 ppm CO, and various amounts of $O_2$ added as 4% $O_2$ in $N_2$, with the balance being nitrogen. The total gas feed rate excluding the $O_2$ containing gas feed was 1000-1100 sccm. All additives were effective in converting $NH_3$ in excess of 99%. As observed in FIG. 2, all Additives are also effective in minimizing the conversion of $NH_3$ to NO. However, Additives D, E and I are the most effective in minimizing conversion of $NH_3$ to NO.

No other nitrogen oxides (e.g., $NO_2$ or $N_2O$) were detected, indicating the conversion to molecular nitrogen of any $NH_3$ not converted to NO.

Example 13

The activity of Additive B for reducing NO emissions from the FCC unit regenerator was evaluated in the DCR under full burn regeneration conditions with the same commercial FCC feed shown in Table 3. The DCR was operated with 1% excess $O_2$ in the regenerator, and with the regenerator at 705° C. The DCR was charged initially with approximately 1800 g of a commercially available cracking catalyst, SUPERNOVA® DMR+ obtained from Grace Davison. The cracking catalyst was hydrothermally deactivated in a fluidized bed reactor with 100% steam for 4 h at 816° C. After stabilization of the unit, the baseline NO emissions data were collected using an on-line Lear-Siegler $SO_2$/NO Analyzer (SM8100A). Subsequently, a blend of 100 g of catalyst was added to the DCR consisting of 95.25 g of the hydrothermally deactivated SUPERNOVA® DMR+ catalyst and 4.75 g of a commercially available conventional CO combustion promoter (CP-30, obtained from Grace Davison), which had been deactivated for 20 hours at 788° C. without any added Ni or V using the Cyclic Propylene Steaming method (CPS). The CPS method has been described in L. T. Boock, T. F. Petti, and J. A Rudesill, "Contaminant-Metal Deactivation and Metal-Dehydrogenation Effects During Cyclic Propylene Steaming of Fluid Catalytic Cracking Catalysts," Deactivation and Testing of Hydrocarbon Processing Catalysts, ACS Symposium Series 634, p. 171 (1996), ISBN 0-8412-3411-6, which description is herein incorporated by reference. NO emissions data were continuously collected, and once the unit was again stabilized, a blend containing 0.525 g of the deactivated CP-30 with 26.25 g of Additive B and 183.75 g of the deactivated SuperNova® DMR+ catalyst was added to the DCR. The NO emissions data is shown Table 6. It can be observed from these data that Additive B is effective for reducing NO emissions in the FCC unit regenerator.

TABLE 6

NO reduction by Additive B in the DCR regenerator operating in full burn mode

| Additive Level (wt. %) | Average NO emissions with equilibrium catalyst and 0.25% CP-3 added (ppmv) | NO emissions after 3 hours on Additive B (ppmv) | NO reduction (%) |
|---|---|---|---|
| 1.25 | 263 | 180 | 32 |

Example 14

Figure 3:
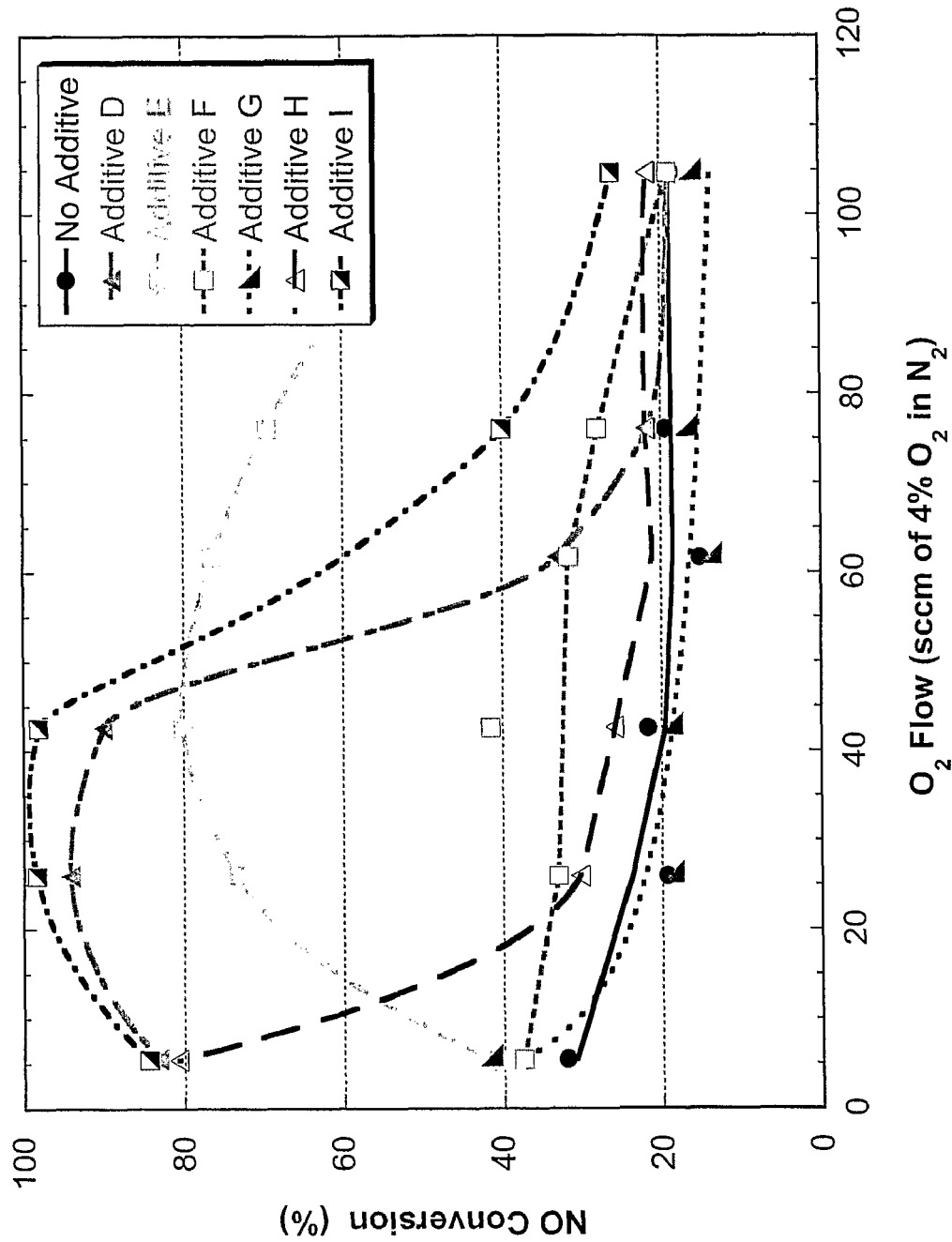
FIG. 3 is a graphic representation of the effectiveness of Additives D, E, F, G, H and I, as prepared in EXAMPLES 4, 5, 6, 7, 8 and 9 respectively, for reducing NO by reacting NO with CO in a RTU.

The activity of Additives D through I for reducing NO emissions from the FCCU regenerator was assessed by measuring the activity for catalyzing the reduction of NO by CO in the RTU. After calcination for 2 hours at 593° C., each additive was blended at 0.5% level with a FCC catalyst, OCTACAT®-DCH obtained from Grace Davison, which had been deactivated for 4 hours at 816° C. in a fluidized bed reactor with 100% steam. The cracking catalyst alone or the blend was then fed to the RTU reactor operating at 700° C. The gas feed to the reactor was a mixture containing approximately 5000-5500 ppm CO, 500-550 ppm NO, various amounts of oxygen added as 4% $O_2/N_2$, and the balance nitrogen. The total gas feed rate excluding the $O_2$ containing gas feed was 1000-1100 sccm. The amount of oxygen during this experiment was varied so that the conditions in the RTU reactor would simulate reducing and oxidizing areas of an FCCU regenerator. The results are shown in FIG. 3. The data show that with the exception of Additive G, all additives are effective in reducing NO emissions. However, Additives D, E and I are the most effective in reducing NO emissions.

Example 15

The CO oxidation activity of Additives E through J was assessed in the RTU using a cracking catalyst coked in the Davison Circulating Riser (DCR). The FCC catalyst, OCTACAT®-DCH obtained from Grace Davison, Columbia, Md., was first deactivated for 4 hours at 816° C. in a fluidized bed reactor with 100% steam before being coked by being circulated in the DCR to react with a FCC feed. The properties of the coked catalyst are shown in Table 7 below. For comparison purposes, the CO oxidation activity of a conventional CO combustion promoter (CP-3® obtained from Grace Davison), which had been deactivated for 20 hours at 788° C. without any added Ni or V using the CPS method, was also evaluated. Each additive tested was mixed with the coked cracking catalyst at 0.2 wt. % (Additives E-J) or 0.1 wt. % additive level (CP-30). The coked catalyst or the blend was then fed into the RTU reactor operating at 700° C. respectively, and the coke was burnt with a gas mixture of air and nitrogen so that there was 1.1% $O_2$ in the RTU reactor effluent. The CO measured at the reactor effluent is a measure of the CO combustion activity under catalytic cracking conditions and the actual amount of CO present is inversely correlated to the CO oxidation activity of the additive. The results recorded in Table 8 below show that Additives E through J are not effective as CO combustion promoters even when used at twice the amount of the conventional CO promoter.

TABLE 7

Properties of coked catalyst used in Example 15

| | | |
|---|---|---|
| $SiO_2$ | wt % | 53.4 |
| $Al_2O_3$ | wt % | 43.5 |
| $RE_2O_3$ | wt % | 0.14 |
| $Na_2O$ | wt % | 0.43 |
| $SO_4$ | wt % | 0.67 |
| $Fe_2O_3$ | Wt % | 0.59 |
| $TiO_2$ | wt % | 0.99 |
| C | wt % | 0.87 |
| Surface Area | $m^2/g$ | 189 |

TABLE 8

CO emissions during coked FCC catalyst regeneration in the RTU with Additives E through J and CP-3 ® blended with the coked catalyst

| Additive | Amount (wt. %) | CO emissions (ppmv) |
|---|---|---|
| No additive | | 3440 |
| CP-3 ® | 0.1 | 750 |
| Additive E | 0.2 | 2100 |
| Additive F | 0.2 | 1740 |
| Additive G | 0.2 | 3520 |
| Additive H | 0.2 | 3410 |
| Additive I | 0.2 | 1850 |
| Additive J | 0.2 | 3100 |

Although the present invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

What is claimed is:

1. A process of reducing the content of $NO_x$ emissions and gas phase reduced nitrogen species released from the regeneration zone during fluid catalytic cracking of a hydrocarbon feedstock into lower molecular weight components, said process comprising
   (A) contacting a hydrocarbon feedstock during a fluid catalytic cracking (FCC) process wherein a regeneration zone of a fluid catalytic cracking unit (FCCU) is operated in a partial or incomplete combustion mode under FCC conditions, with a circulating inventory of (1) a Y-type zeolite FCC cracking catalyst and (2) an effective gas phase reduced nitrogen species reducing amount of a particle $NO_x$ reduction composition having a particle size greater than 45 μm and consisting of (a) a zeolite component having (i) a pore size ranging from about 2 to about 7.1 Angstroms and (ii) a $SiO_2$ to $Al_2O_3$ molar ratio of less than 500, wherein the zeolite component is optionally exchanged with at least one stabilizing metal selected from the group consisting of Groups 1B, 2A, 3B, 4B, B, 6B, 7B, 2B, 3A, 4A, 5A, and the Lanthanide Series of The Periodic Table, nickel, iron, cobalt and mixtures thereof; (b) at least one noble metal selected from the group consisting of platinum, palladium, rhodium, iridium, osmium, ruthenium, rhenium and mixtures thereof; and (c) an inorganic binder; (d) optionally, clay; (e) optionally, a matrix material selected from the group consisting of alumina, silica, silica-alumina, yttria, lanthana, ceria, neodymia, samaria, europia, gadolinia, titania, zirconia, prasedoymia and mixtures thereof; and (f) optionally, an additional zeolite; and
   (B) reducing the content of $NO_x$ emissions an gas phase reduced nitrogen species released from the regeneration zone during the fluid catalytic cracking process.

2. The process of claim 1 wherein the zeolite component of the $NO_x$ reduction composition has a pore size ranging from about 3.5 to about 6.5 Angstroms.

3. The process of claim 1 wherein the zeolite component is selected from the group consisting of ZSM-11, beta, MCM-49, mordenite, MCM-56, Zeolite-L, zeolite Rho, erionite, chabazite, clinoptilolite, MCM-22, MCM-35, MCM-61, Offretite, A, ZSM-12, ZSM-23, ZSM-18, ZSM-22, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelinite, Gismondine, Cancrinite, Brewsterite, Stilbite, Paulingite, Goosecreekite, Natrolite, omega, ferrierite and mixtures thereof.

4. The process of claim 3 wherein the zeolite component is selected from the group consisting of ferrierite, beta, MCM-49, mordenite, MCM-56, zeolite Rho, erionite, chabazite, clinoptilolite, MCM-22, Offretite, A, ZSM-12, ZSM-23, omega and mixtures thereof.

5. The process of claim 4 wherein the zeolite component is ferrierite.

6. The process of claim 1 wherein the amount of zeolite component present in the $NO_x$ reduction composition is at least 10 weight percent of the composition.

7. The process of claim 6 wherein the amount of zeolite component present in the $NO_x$ reduction composition is at least 30 weight percent of the composition.

8. The process of claim 7 wherein the amount of zeolite component present in the $NO_x$ reduction composition is at least 40 weight percent of the composition.

9. The process of claim 1 wherein the amount of zeolite component present in the $NO_x$ reduction composition ranges from about 10 to about 85 weight percent of the composition.

10. The process of claim 9 wherein the amount of zeolite component present in the $NO_x$ reduction composition ranges from about 30 to about 80 weight percent of the composition.

11. The process of claim 10 wherein the amount of zeolite component present in the $NO_x$ reduction composition ranges from about 40 to about 75 weight percent of the composition.

12. The process of claim 1 wherein the zeolite component is exchanged with a cation selected from the group consisting of hydrogen, ammonium, alkali metal and combinations thereof.

13. The process of claim 1 wherein the inorganic binder is selected from the group consisting of silica, alumina, silica-alumina and mixtures thereof.

14. The process of claim 13 wherein the inorganic binder is alumina.

15. The process of claim 14 wherein the alumina is an acid or base peptized alumina.

16. The process of claim 14 wherein the alumina is aluminum chlorohydrol.

17. The process of claim 1 wherein the amount of inorganic binder present in the particulate $NO_x$ reduction composition ranges from about 5 to about 50 weight percent of the composition.

18. The process of claim 17 wherein the amount of inorganic binder present in the particulate $NO_x$ reduction composition ranges from about 10 to about 30 weight percent of the composition.

19. The process of claim 18 wherein the amount of inorganic binder present in the particulate $NO_x$ reduction composition ranges from about 15 to about 25 weight percent of the composition.

20. The process of claim 1 wherein the additional zeolite is ZSM-5.

21. The process of claim 1 wherein the additional zeolite component is present in an amount ranging from about 1 to about 80 weight percent of the composition.

22. The process of claim 21 wherein the additional zeolite component is present in an amount ranging from about 10 to about 70 weight percent of the composition.

23. The process of claim 1 wherein the matrix material is present in an amount less than 70 weight percent of the composition.

24. The process of claim 1 wherein the stabilizing metal is selected from the group consisting of Groups 1B, 3B, 2A, 2B, 3A, the Lanthanide Series of the Periodic Table, iron and mixtures thereof.

25. The process of claim 24 wherein the stabilizing metal is selected from the group consisting of lanthanum, aluminum, magnesium, zinc, iron, copper and mixtures thereof.

26. The process of claim 25 wherein the stabilizing metal is incorporated into the pores of the zeolite component.

27. The process of claim 1 wherein the noble metal is selected from group consisting of rhodium, iridium, osmium, ruthenium, rhenium and mixtures thereof.

28. The process of claim 27 wherein the noble metal is selected from group consisting of rhodium, iridium and mixtures thereof.

29. The process of claim 1 wherein the noble metal is present in an amount, calculated as the metal, of at least 0.1 parts per million of the $NO_x$ reduction composition.

30. The process of claim 29 wherein the noble metal is present in an amount, calculated as the metal, of at least 0.5 parts per million of the $NO_x$ reduction composition.

31. The process of claim 30 wherein the noble metal is present in an amount, calculated as the metal, of at least 1.0 part per million of the $NO_x$ reduction composition.

32. The process of claim 1 wherein step (A) further comprising recovering the cracking catalyst from said contacting step and treating the used catalyst in a regeneration zone to regenerate said catalyst.

33. The process of claim 1 wherein the cracking catalyst and the particulate $NO_x$ reduction composition are fluidized during contacting said hydrocarbon feedstock.

34. The process of claim 1 wherein the particulate $NO_x$ reduction composition has a mean particle size from about 55 to about 150 µm.

35. The process of claim 1 wherein the particulate $NO_x$ reduction composition has a Davison attrition index (DI) value of less than 50.

36. The process of claim 35 wherein the particulate $NO_x$ reduction composition has a DI value of less than 20.

37. The process of claim 36 wherein the particulate $NO_x$ reduction composition has a DI value of less than 15.

38. The process of claim 1 wherein the zeolite component of the $NO_x$ reduction composition has a $SiO_2$ to $Al_2O_3$ molar ratio of less than 250.

39. The process of claim 38 wherein the zeolite component of the $NO_x$ reduction composition has a $SiO_2$ to $Al_2O_3$ molar ratio of less than 100.

40. A low CO combustion composition for reducing the content of $NO_x$, and gas phase reduced nitrogen species in the presence of an FCC catalyst during a FCC process operated in partial or incomplete combustion mode, said low CO combustion composition consisting of (1) a zeolite component having (i) a pore size ranging from about 2 to about 7.1 Angstroms and (ii) a $SiO_2$ to $Al_2O_3$ molar ratio of less than 500, said zeolite optionally being exchanged with at least one stabilizing metal selected from the group consisting of Groups 1B, 2A, 3B, 4B, 5B, 6B, 7B, 2B, 3A 4A, 5A, and the Lanthanide Series of The Periodic Table, nickel, iron cobalt and mixtures thereof: (2) at least one noble metal selected from the group consisting of platinum, palladium, rhodium, iridium, osmium, ruthenium, rhenium and mixtures thereof; (3) an inorganic binder; (4) optionally, clay; (5) optionally, a matrix material selected from the group consisting of alumina, silica, silica-alumina, yttria, lanthana, ceria, neodymia, samaria, europia, gadolinia, titania, zirconia, prasedoymia and mixtures thereof.

41. The. composition of claim 40 wherein the zeolite component has a pore size ranging from about 3.5 to about 6.5 Angstroms.

42. The composition of claim 40 wherein the zeolite component is selected from the group consisting of ZSM-11, beta, MCM-49, mordenite, MCM-56, Zeolite-L, zeolite Rho, erionite, chabazite, clinoptilolite, MCM-22, MCM-35, MCM-61, Offretite, A, ZSM-12, ZSM-23, ZSM-18, ZSM-22, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelinite, Gismondine, Cancrinite, Brewsterite, Stilbite, Paulingite, Goosecreekite, Natrolite, omega, ferrierite and mixtures thereof.

43. The composition of claim 42 wherein the zeolite component is selected from the group consisting of ferrierite, beta, MCM-49, mordenite, MCM-56, zeolite Rho, erionite, chabazite, clinoptilolite, MCM-22, Offretite, A, ZSM-12, ZSM-23, omega and mixtures thereof.

44. The composition of claim 43 wherein the zeolite component is ferrierite.

45. The composition of claim 40 wherein the low CO combustion composition is a separate particulate additive composition mixed within a circulating inventory of a FCC cracking catalyst.

46. The composition of claim 45 wherein the low CO combustion composition has a mean particle size of greater than 45 µm.

47. The composition of claim 46 wherein the particulate low CO combustion composition has a mean particle size from about 55 to about 150 µm.

48. The composition of claim 45 wherein the amount of zeolite component present in the low CO combustion composition is at least 10 weight percent of the composition.

49. The composition of claim 45 wherein the amount of zeolite component present in the low CO combustion composition ranges from about 10 to about 85 weight percent of the composition.

50. The composition of claim 49 wherein the amount of zeolite component present in the low CO combustion composition ranges from about 30 to about 80 weight percent of the composition.

51. The composition of claim 50 wherein the amount of zeolite component present in the low CO combustion composition ranges from about 40 to about 75 weight percent of the composition.

52. The composition of claim 45 wherein the particulate low CO combustion composition has a Davison attrition index (DI) value of less than 50.

53. The composition of claim 52 wherein the particulate low CO combustion composition has a DI value of less than 20.

54. The composition of claim 45 wherein the low CO combustion composition is present in an amount of at least 0.01 weight percent of the FCC catalyst inventory.

55. The composition of claim 54 wherein the low CO combustion composition is present in an amount ranging from about 0.01 to 50 weight percent of the FCC catalyst inventory.

56. The composition of claim 40 wherein the zeolite component is exchanged with a cation selected from the group consisting of hydrogen, ammonium, alkali metal and combinations thereof.

57. The composition of claim 40 wherein the inorganic binder is selected from the group consisting of silica, alumina, silica-alumina and mixtures thereof.

58. The composition of claim 57 wherein the inorganic binder is alumina.

59. The composition of claim 58 wherein the alumina is an acid or base peptized alumina.

60. The composition of claim 58 wherein the alumina is aluminum chlorohydrol.

61. The composition of claim 40 wherein the amount of inorganic binder present in the low CO combustion composition ranges from about 5 to about 50 weight percent of the composition.

62. The composition of claim 61 wherein the amount of inorganic binder present in the low CO combustion composition ranges from about 10 to about 30 weight percent of the composition.

63. The composition of claim 62 wherein the amount of inorganic binder present in the low CO combustion composition ranges from about 15 to about 25 weight percent of the composition.

64. The composition of claim 49 wherein the additional zeolite is ZSM-5.

65. The composition of claim 49 wherein the additional zeolite component is present in an amount ranging from about 1 to about 80 weight percent of the composition.

66. The composition of claim 40 wherein the matrix material is present in an amount less than 70 weight percent of the composition.

67. The composition of claim 40 wherein the stabilizing metal is selected from the group consisting of Groups 1B, 3B, 2A, 2B, 3A, the Lanthanide Series of the Periodic Table, iron and mixtures thereof.

68. The composition of claim 67 wherein the stabilizing metal is selected from the group consisting of lanthanum, aluminum, magnesium, zinc, iron, copper and mixtures thereof.

69. The composition of claim 40 wherein the stabilizing metal is incorporated into the pores of the zeolite component.

70. The composition of claim 40 wherein the low CO combustion composition is an integral component of an FCC cracking catalyst.

71. The composition of claim 70 wherein the low CO combustion composition is present in an amount of at least 0.005 weight percent of the FCC catalyst.

72. The composition of claim 71 wherein the low CO combustion composition is present in an amount ranging from about 0.005 to 50 weight percent of the FCC catalyst.

73. The composition of claim 70 wherein the zeolite component is present in an amount of at least 0.005 weight percent of the FCC catalyst.

74. The composition of claim 40 wherein the noble metal is selected from group consisting of rhodium, iridium, osmium, ruthenium, rhenium and mixtures thereof.

75. The composition of claim 74 wherein the noble metal is selected from group consisting of rhodium, iridium and mixtures thereof.

76. The composition of claim 40 wherein the noble metal is present in an amount, calculated as the metal, of at least 0.1 parts per million of the low CO combustion composition.

77. The composition of claim 76 wherein the noble metal is present in an amount. calculated as the metal, of at least 0.5 parts per million of the low CO combustion composition.

78. The composition of claim 77 wherein the noble metal is present in an amount, calculated as the metal, of at least 1.0 part per million of the low CO combustion composition.

79. The composition of claim 40 wherein the zeolite component of the low CO combustion composition has a $SiO_2$ to $Al_2O_3$ molar ratio of less than 250.

80. The composition of claim 79 wherein the zeolite component of the low CO combustion composition has a $SiO_2$ to $Al_2O_3$ molar ratio of less than 100.

81. The process of claim 1 wherein the particulate $NO_x$ reduction composition is present in an amount of at least 0.01 weight percent of the FCC catalyst inventory.

82. The process claim 81 wherein the $NO_x$ reduction composition is present in an amount ranging from about 0.01 to 50 weight percent of the FCC catalyst inventory.

* * * * *